United States Patent [19]
Iwata

[11] Patent Number: 6,070,138
[45] Date of Patent: May 30, 2000

[54] SYSTEM AND METHOD OF ELIMINATING QUOTATION CODES FROM AN ELECTRONIC MAIL MESSAGE BEFORE SYNTHESIS

[75] Inventor: Kazuhiko Iwata, Tokyo, Japan

[73] Assignee: NEC Corporation, Japan

[21] Appl. No.: 08/772,549

[22] Filed: Dec. 26, 1996

[30] Foreign Application Priority Data

Dec. 26, 1995 [JP] Japan .................................. 7-339157

[51] Int. Cl.[7] .................................................. G10L 5/02
[52] U.S. Cl. .......................................... 704/260; 704/269
[58] Field of Search .................................. 704/258, 260, 704/269

[56] References Cited

U.S. PATENT DOCUMENTS

| | | | |
|---|---|---|---|
| 4,685,135 | 8/1987 | Lin | 381/52 |
| 5,444,768 | 8/1995 | Lemaire et al. | 379/68 |
| 5,647,002 | 7/1997 | Brunson | 704/260 |

FOREIGN PATENT DOCUMENTS 3-289854  12/1991  Japan .

OTHER PUBLICATIONS

K. Iwata, et al., "Japanese Text–to–Speech Software for Personal Computers", Proceedings of Autumn Meeting 1993, Acoustic Society of Japan, 2–8–13, pp. 245–246.

Rabiner, Lawrence. Applications of Voice Processing to Telecommunications. Proceedings of the IEEE, vol. 82, No. 2, Feb. 1994. pp. 199–228.

Morishima et al. Image synthesis and editing system for a multimedia human image. Image Processing and Its applications. 270–273, 1992.

Rabiner, Lawrence. Applications of Voice Processing to Telecommunications. Proceedings of the IEEE, Feb. 1994.

Primary Examiner—David R. Hudspeth
Assistant Examiner—M. David Sofocleous
Attorney, Agent, or Firm—Ostrolenk, Faber, Gerb & Soffen, LLP.

[57] ABSTRACT

In order to provide a practical E-mail reader for reading out E-mails phonetically enabling easy grasping of their contents by a user with its vocal output even when quotation codes or header information are included in the E-mails, a phonetic E-mail reader of the invention comprises a speech synthesizer (102) for converting text data into vocal data, quotation code storing means (105) for storing quotation codes used for indicating a quotation line inserted at a top of the quotation line, and quotation code elimination means (106) for detecting and eliminating a quotation code inserted at tops of quotation lines referring to the quotation code storing means (105) before supplying the quotation lines to the speech synthesizer (102).

13 Claims, 6 Drawing Sheets

SYSTEM AND METHOD OF ELIMINATING QUOTATION CODES FROM AN ELECTRONIC MAIL MESSAGE BEFORE SYNTHESIS

BACKGROUND OF THE INVENTION

The present invention relates to a phonetic reader for reading out a correspondence text transmitted through an electronic network (hereafter called E-mail).

A text-speech converter for reading out an input text data phonetically by voice synthesizing is reported in "Japanese Text-to-Speech Software for Personal Computers" by Iwata et al., 2-8-13, pp. 245–246 of the Proceedings of Autumn Meeting 1993, Acoustic Society of Japan, and an application of text-speech converter for the E-mail system is disclosed in a Japanese patent application entitled "Electronic Mail System", laid open as a Provisional Publication No. 289854/'91, wherein a special character code is inserted in E-mail text to make a pause for waiting a response from the listener, which is replaced with the inserted special character code in its reply mail.

According to the development of global computer network as the Internet, application of the text-speech converter to the E-mail system is expected as practical communication media, especially between people having visual inconvenience and other people.

However, as the E-mail correspondence has been developed on visual media such as computer display or printed lists, there are spread some special conventions, one of which is a quotation code such as '>' or '|' added to each line head of paragraphs quoted from other text. These quotation codes make conventional text-speech converters easily misunderstand the E-mail texts. Especially in languages where no space is inserted between words and so no word lapping is performed, such as Japanese or Chinese texts, the quotation code may separate a word into two parts.

FIG. 9 illustrates an example of a Japanese text transmitted by the E-mail system, wherein the first (saying "Tomorrow from 10 o'clock, the me-") and the second ("eting will be held.") lines are quotation from other E-mail text, and the third line is the reply from the sender (saying "I will present."). Hereafter, in the specification, each of the quoted lines is called a quotation line, parts of quotation lines originally continued are called a quotation section, and a paragraph consisting of quotation lines is called a quotation paragraph, while other paragraphs being called communication paragraphs consisting of communication lines including communication sections.

In the example of FIG. 9, a word "会議" (meeting) from end of the first line to top of the second line is separated by the quotation code '>' into '会' and '議',
and therefore the conventional text-speech converter can not recognize the word "会議",
resulting in a mis-read.

Further, texts are read out by a mono-tone in the conventional text-speech converter irrespectively of difference between the quotation paragraphs and the communication paragraphs. So, there are certain practical problems of difficulty for grasping the contents at once or contrarily troublesomeness to be forced to hear well-known texts again.

Still further, E-mail texts are generally added with header information used for delivering in the network, not necessary to be read out in many cases. For omitting the header information, some listener's intervention is required for excluding the header information from texts to be read out in the conventional text-speech converter.

SUMMARY OF THE INVENTION

Therefore, a primary object of the present invention is to provide a practical E-mail reader for reading out E-mail texts phonetically enabling easy grasping of their contents by a user with its vocal output even when quotation codes or header information are included in the E-mail texts.

In order to achieve the object, a phonetic E-mail reader of the invention comprises:

a speech synthesizer for converting text data delivered thereto into vocal data corresponding to the text data;

quotation code storing means for storing quotation codes used for indicating a quotation line in an E-mail text by inserting at least one of said quotation codes at a top of said quotation line; and quotation code elimination means for detecting and eliminating one of said quotation codes inserted at tops of quotation lines in E-mail texts supplied therein referring to said quotation code storing means before supplying each of said quotation lines, and passing on communication paragraphs each composed of a series of at least one of other lines in said E-mail texts that said quotation lines, to said speech synthesizer for converting into vocal data corresponding thereto.

Another phonetic E-mail reader of the invention further comprises:

communication parameter storing means for storing values of parameters to be delivered to said speech synthesizer for determining features of vocal data into which said communication paragraphs are to be converted;

quotation parameter storing means for storing values of parameters to be delivered to said speech synthesizer for determining features of vocal data into which quotation paragraphs each composed of a series of at least one of said quotation lines are to be converted; and a selector for selecting said communication parameter storing means for delivering parameter values stored therein to said speech synthesizer when said communication paragraphs are supplied to said speech synthesizer, and selecting said quotation parameter storing means for delivering parameter values stored therein to said speech synthesizer when said quotation paragraphs are supplied to said speech synthesizer, controlled by said quotation code elimination means.

Another phonetic E-mail reader of the invention further comprises:

notification message storing means for storing a beginning message for notifying a beginning of each of said quotation paragraphs, converted into voice data corresponding thereto, and an ending message for notifying an ending of each of said quotation paragraphs, converted into voice data corresponding thereto; and a read-out controller for replacing a beginning signal with said beginning message stored in said notification message storing means when said quotation code elimination means insert said beginning signal at each beginning of said quotation paragraphs, and replacing an ending signal with said ending message stored in said notification message storing means when said quotation code elimination means insert said ending signal at each end of said quotation paragraphs.

Another phonetic E-mail reader of the invention further comprises:

text parameter storing means for storing values of parameters to be delivered to said speech synthesizer for determining features of vocal data into which said communication paragraphs and said quotation paragraphs are to be converted;

notification parameter storing means for storing values of parameters to be delivered to said speech synthesizer for determining features of vocal data into which said beginning message and said ending message are to be converted; and a selector for selecting said text parameter storing means for delivering parameter values stored therein to said speech synthesizer when either of said communication paragraphs and said quotation paragraphs are supplied to said speech synthesizer, and selecting said notification parameter storing means for delivering parameter values stored therein to said speech synthesizer when either of said beginning message and said ending message are supplied to said speech synthesizer, controlled by said read-out controller.

In another phonetic E-mail reader of the invention:

said quotation code elimination means eliminate one of said quotation codes inserted at tops of quotation lines in E-mail texts supplied therein together with all character codes of said quotation lines referring to said quotation code storing means when controlled in an omitting mode.

In another phonetic E-mail reader of the invention:

said quotation code elimination means eliminate one of said quotation codes inserted at tops of quotation lines in E-mail texts supplied therein together with all character codes of said quotation lines referring to said quotation code storing means and insert an omitting signal instead of each of said quotation paragraphs eliminated when controlled in an omitting mode; and said notification message storing means further store an omitting message for notifying omission of each of said quotation paragraphs eliminated, converted into voice data corresponding thereto; and said read-out controller replaces said omitting signal with said omitting message stored in said notification message storing means when said quotation code elimination means insert said omitting signal.

Still another phonetic E-mail reader of the invention further comprises:

a header elimination means for eliminating header information from an E-mail text before supplied to said quotation code elimination means when said header information is added to said E-mail text through network delivering.

Thus, a practical E-mail reader for reading out E-mail text phonetically is provided in the invention, enabling easy grasping of their contents by a user with its vocal output even when quotation codes or header information are included in the E-mail texts.

BRIEF DESCRIPTION OF THE DRAWING(S)

The foregoing, further objects, features and advantages of this invention will become apparent from a consideration of the following description, the appended claims, and the accompanying drawings wherein the same numerals indicate the same or the corresponding parts, and:

Figure 1:
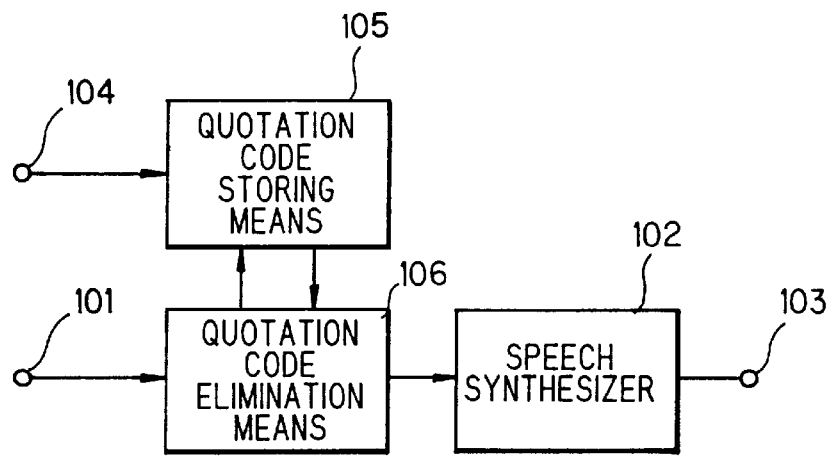
FIG. 1 is a block diagram illustrating a first embodiment of the invention.
Figure 3:
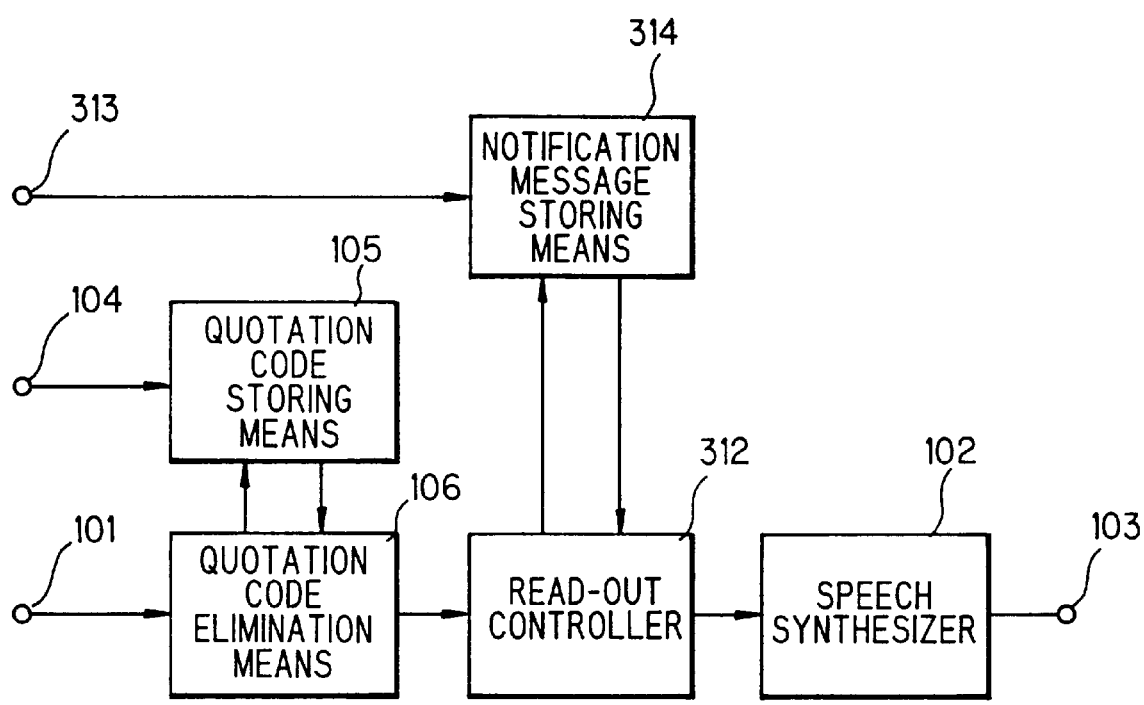
FIG. 3 is a block diagram illustrating a third embodiment of the invention.
Figure 6:
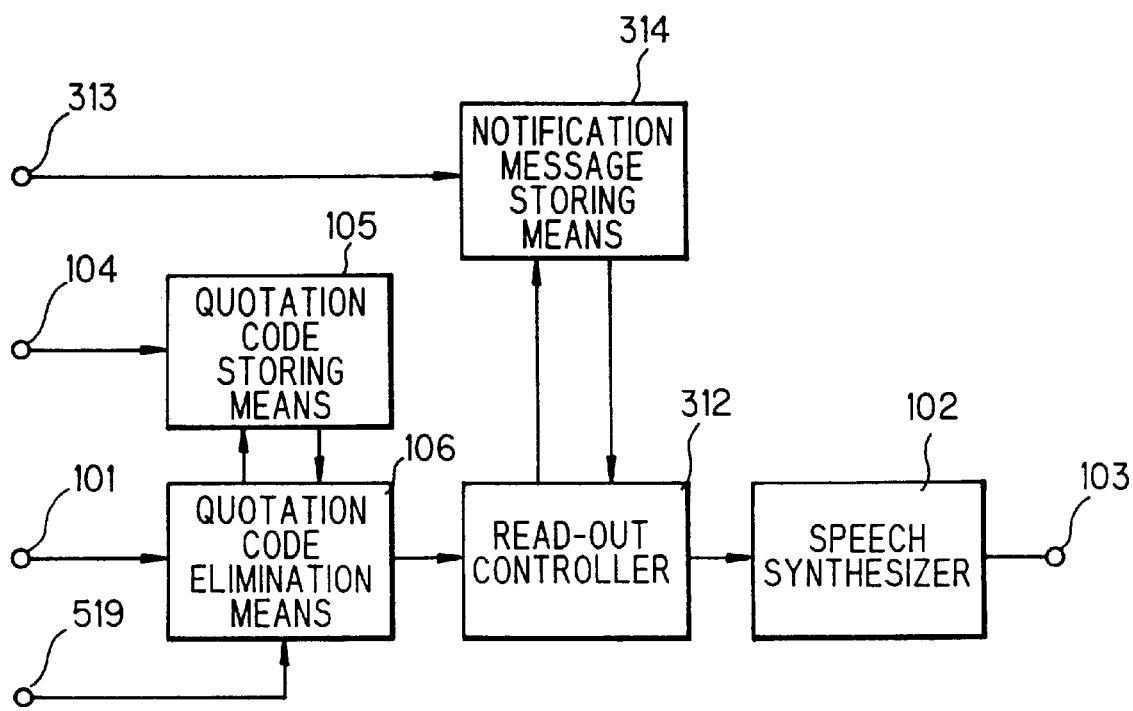
FIG. 6 is a block diagram illustrating a sixth embodiment of the invention.
Figure 8:
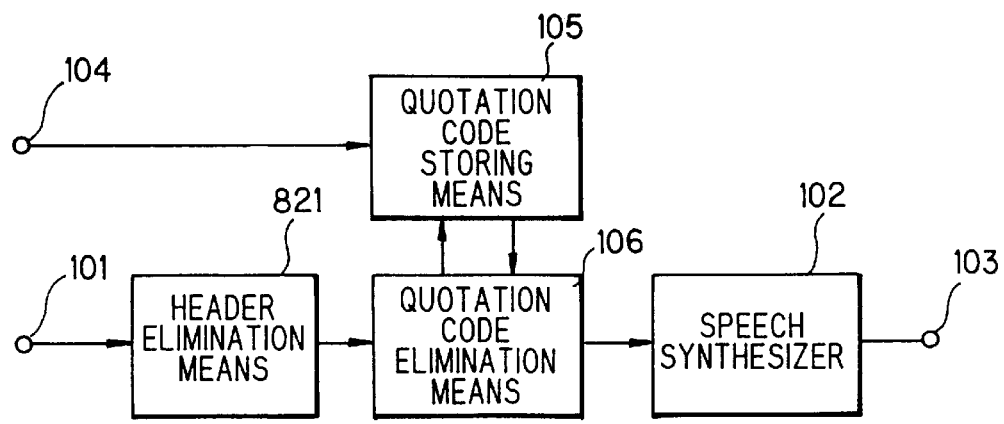

FIG. 8. is a block diagram illustrating an eighth embodiment of the invention;

FIG. 9 illustrates an example of a Japanese text transmitted by the E-mail;

FIG. 10 illustrates an E-mail text including a duplicate quotation paragraph quoting the E-mail text of FIG. 9;

FIG. 11 illustrates the E-mail text of FIG. 10 after processed by quotation code elimination means 106 of FIG. 1;

FIG. 12 illustrates an example of text data supplied from the read-out controller 312 of FIG. 3; and FIG. 13 is an example of text data to be read out in the sixth embodiment of FIG. 6.

DETAILED DESCRIPTION OF THE INVENTION

Now, embodiment of the present invention will be described in connection with the drawings.

FIG. 1 is a block diagram illustrating a first embodiment of the invention.

The phonetic E-mail reader of FIG. 1 comprises quotation code elimination means 106, quotation code storing means 105 and a speech synthesizer 102.

The quotation code elimination means 106 eliminate a quotation code when it is found at the top of each line of an E-mail text delivered through a text input terminal 101, referring to a code list registered in the quotation code storing means 105 and listing up character codes to be used as the quotation code. The quotation code storing means 105 are preferably provided with an instruction terminal 104 for a user adding or deleting character codes in the code list. The E-mail text without quotation code thus processed are supplied to the speech synthesizer 102 for synthesizing vocal data thereof disregarding unnecessary carriage return codes to be output through a vocal output terminal 103.

Therefore, even a quotation section divided into two lines can be converted into proper vocal data in the embodiment.

There are also cases where the quotation code is followed by some space codes or a tab code (hereafter to be called blank codes) for easy visual recognition of quotation paragraphs. In these cases, the quotation code elimination means 106 may eliminate the blank codes following the quotation code.

Further, the quotation code elimination means 106 of the embodiment may eliminate character codes following the quotation code and preceding those other than the blank codes and the quotation codes registered in the code list of the quotation code storing means 105, since there are also cases where the same or different quotation code is used doubly or more for denoting duplicate quotation paragraphs, namely paragraphs cited from quotation paragraphs of another text as illustrated in FIG. 10, where a line expressing "Your kind cooperation, please" is mailed after quoting the reply mail of FIG. 9. The mail text f FIG. 10 is processed by the quotation code elimination means 106 into text illustrated in FIG. 11 before supplied to the speech synthesizer 102, in the cases.

Thus, the quotation section "会議" can be properly recognized even when different quotation codes or blank codes are inserted therein, in the embodiment.

Figure 2:
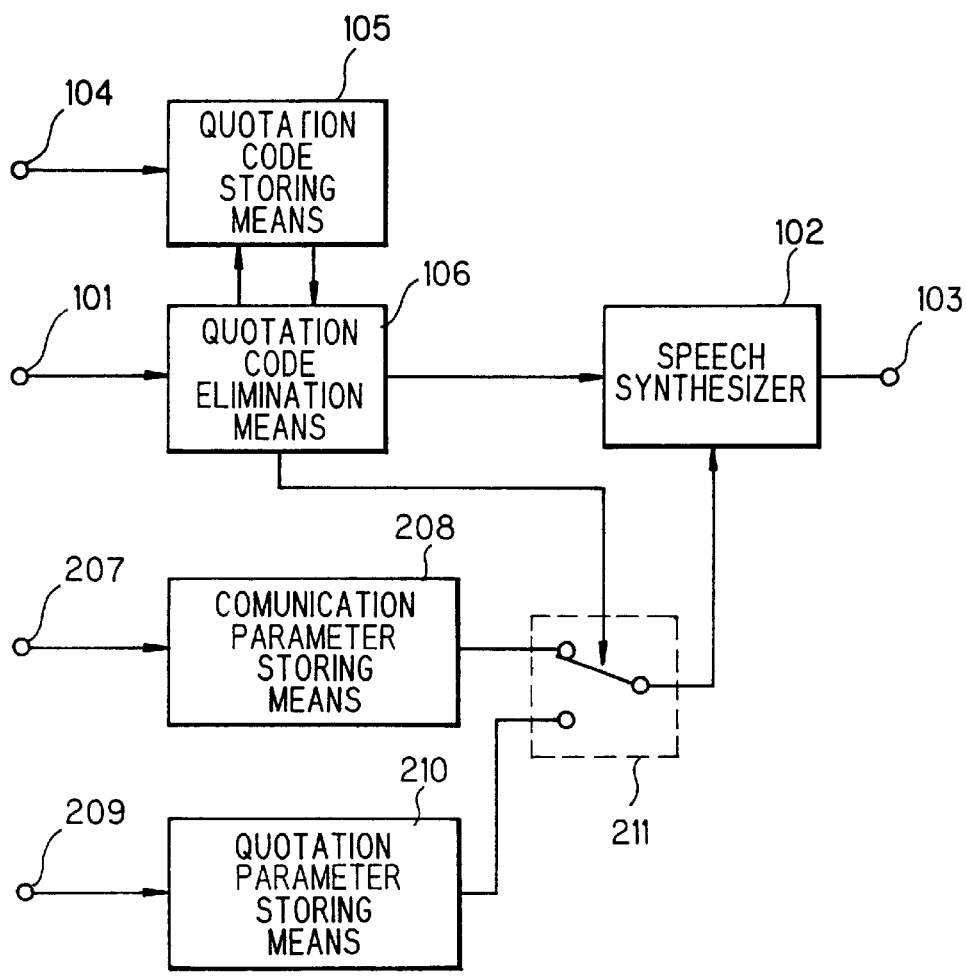
FIG. 2 is a block diagram illustrating a second embodiment of the invention.

FIG. 2 is a block diagram illustrating a second embodiment of the invention, further comprising communication parameter storing means 208, quotation parameter storing means 210, and a selector 211 for selecting parameter values to be delivered to the speech synthesizer 102 controlled by the quotation code elimination means 106.

The communication parameter storing means 208 store parameter values to be set in the speech synthesizer 102 when it converts communication paragraphs into vocal data and are preferably provided with a communication parameter input terminal 207 for user's revision of the parameter values, while the quotation parameter storing means 210 storing parameter values used in the speech synthesizer 102 for converting quotation paragraphs into vocal data and are preferably provided as well a quotation parameter input terminal 209 for user's revision of the parameter values therein.

The quotation code elimination means 106 of the embodiment control the selector 211, so that parameter values in the quotation parameter storing means 210 are supplied to the speech synthesizer 102 when a quotation code is found at the top of a line, eliminating unnecessary codes from the line, and otherwise those in the communication parameter storing means are supplied there. Here, the quotation code elimination means 106 may eliminate the quotation code, the quotation code together with following blank codes, or character codes preceding those other than the blank codes and the quotation codes registered in the code list of the quotation codes storing means 105, as described in connection with the first embodiment.

Therefore, in the second embodiment, quotation paragraphs and communication paragraphs can be read out with different tones, resulting in easy recognition.

For example, when the parameter values in the quotation parameter storing means 210 are prepared to be those corresponding to female voice and the parameter values in the communication parameter storing means 208 corresponding to male voice, the first and the second lines of the mail text of FIG. 9 re read out with feminine voice and the third line is read out with male voice, enabling easy discrimination of quotation paragraphs without visual confirmation. Or parameter values in the quotation parameter storing means 210 may be set for the speech synthesizer reading out rapidly, in case the quotation paragraphs need not duplicated confirmation.

As for parameters to be stored in the communication and the quotation parameter storing means 208 and 210, there may be prepared parameters for controlling speaker's sex, age, reading speed, tone, intonation or loudness of the vocal data to be output, and they may be revised by separately or combinatorially, through the communication and the quotation parameter input terminals 207 and 209, respectively.

FIG. 3 is a block diagram illustrating a third embodiment of the invention, comprising a read-out control 312 and notification message storing means 314 to be referred to by the read-out controller 312, further to the first embodiment of FIG. 1.

The quotation code elimination means 106 of the third embodiment send, to the read-out controller 312, a beginning signal indicating a beginning of quotation paragraphs when a quotation code is found at the top of a line following a communication line, eliminating unnecessary codes from following quotation lines, and an end signal indicating an end of the quotation paragraphs when no quotation code is found at the top of a line following a quotation line, together with processed text data, inserting at corresponding line top and line end, respectively. Here, the quotation code elimination means 106 may eliminate the quotation code, the quotation code together with following blank codes, or character codes preceding those other than the blank codes and the quotation codes registered in the code list of the quotation codes storing means 105, as described in connection with the first embodiment.

The read-out controller 312 passing on the processed text data to the speech synthesizer 102 as they are when no signal is received from the quotation code elimination means 106, it sends a quotation beginning message prepared in the notification message storing means 314 to the speech synthesizer 102 when the beginning signal is transmitted from the quotation code elimination means 106 before passing on the processed text data, and an ending message prepared in the notification message storing means 314 when the end signal is delivered.

Thus, in the third embodiment, a user can discriminate the beginning and the ending of the quotation paragraphs by hearing the voice data corresponding to the beginning and the ending message.

FIG. 12 illustrates an example of text data supplied from the read-out controller 312, wherein a message line having wording "Now, quotation paragraphs." is added before the first line of the mail text of FIG. 11 together with a line added under the second line of FIG. 11, notifying "Until now, quotation paragraphs, thank you.".

Here, the notification message storing means 314 may be preferably provided with a message editing terminal 313 for user's revision of the messages stored therein.

Figure 4:
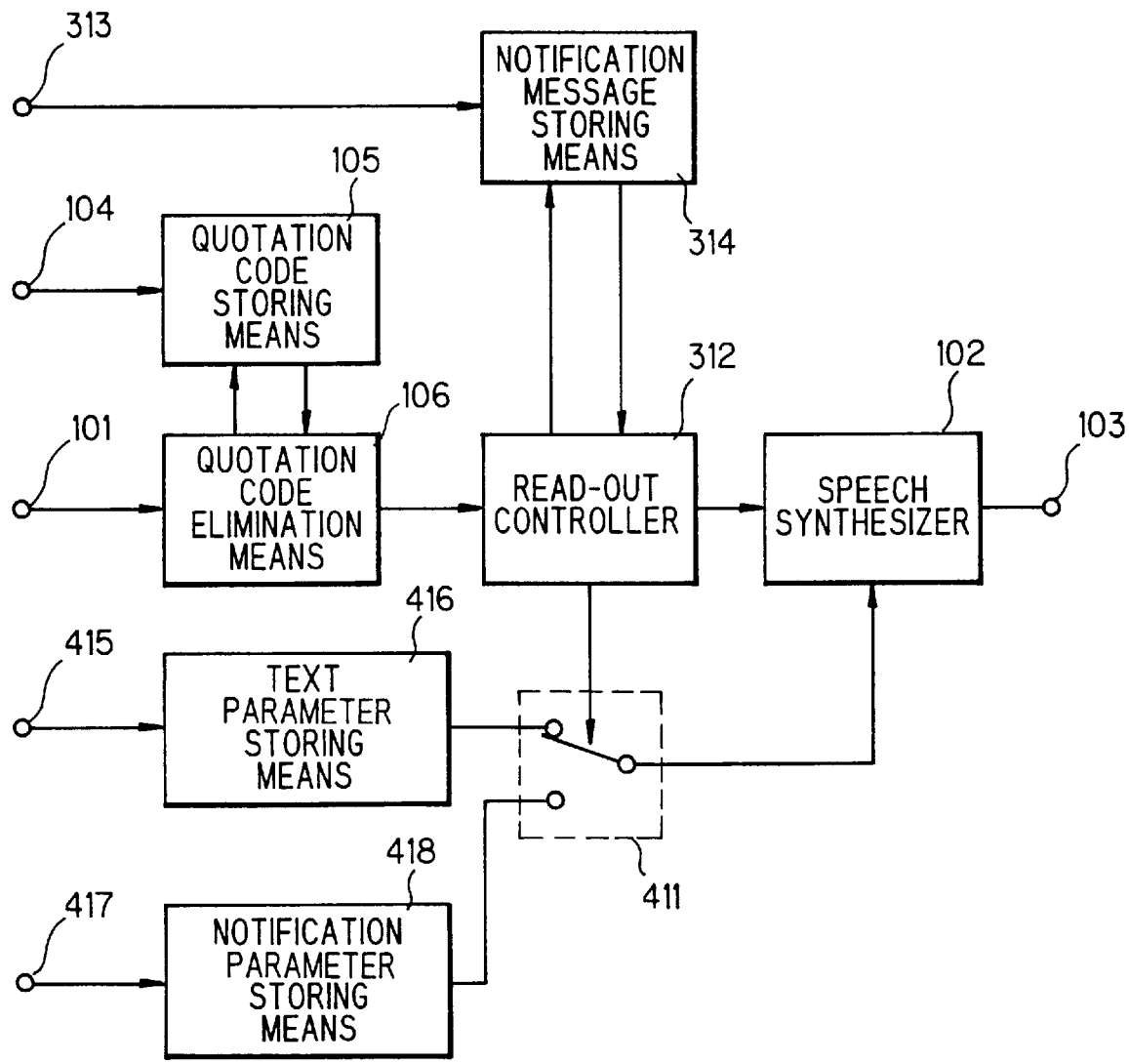
FIG. 4 is a block diagram illustration a fourth embodiment of the invention.

FIG. 4 is a block diagram illustrating a fourth embodiment of the invention, comprising text parameter storing means 416 and notification parameter storing means 418 for storing parameter values to be set in the speech synthesizer 102, selected through a selector 211 controlled by the read-out controller 312.

The text parameter storing means 416 and the notification parameter storing means 418 are preferably provided with a text parameter input terminal 415 and a notification parameter input terminal 417, respectively, for a user revising parameter values therein prepared for controlling features of the vocal data to be output as described in connection with the second embodiment of FIG. 2.

The read-out controller 312 of the embodiment controls the selector 211 to select the notification parameter storing means 418 when the beginning or the ending messages are being supplied, and otherwise to select the text parameter storing means 416.

Therefore, the mail texts and the notification messages can be read out with different tones according to user's taste, in the embodiment, providing easy acoustical notice of beginning and ending of quotation paragraphs in E-mail texts.

Figure 5:
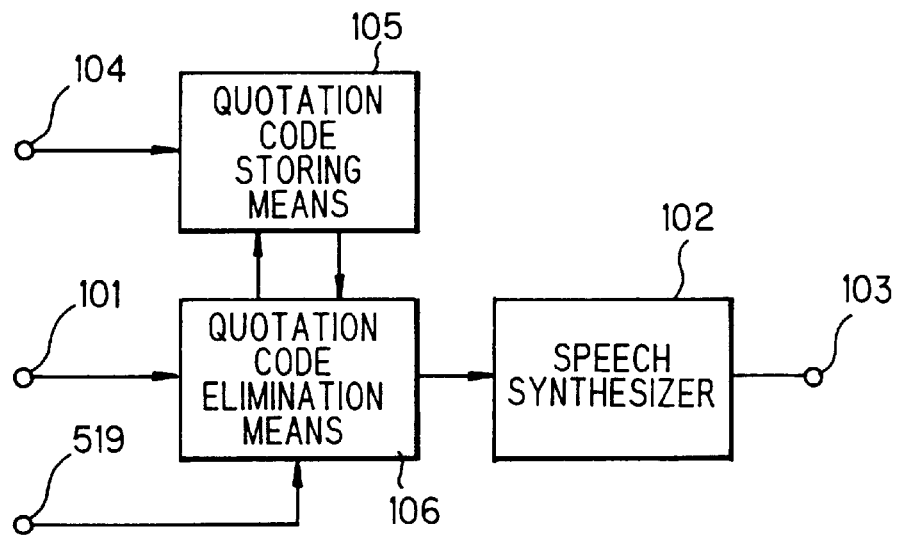
FIG. 5 is a block diagram illustrating a fifth embodiment of the invention.

FIG. 5 is a block diagram illustrating a fifth embodiment of the invention, wherein a quotation control terminal 519 is provided to the quotation code elimination means 106 of a phonetic E-mail reader having a similar configuration with the first embodiment of FIG. 1.

When the quotation code elimination means 106 is controlled in an omitting mode by a user, for example, through the quotation control terminal 519, the quotation code elimination means 106 of the fifth embodiment eliminate a whole line having a quotation code found at its top from the text data to be supplied to the synthesizer 102. While the quotation code elimination means 106 is left in an ordinary mode, the phonetic E-mail reader of the fifth embodiment operate in the same way with the first embodiment of FIG. 1.

Therefore, quotation paragraphs are omitted from E-mail texts to be rapidly reviewed vocally, according to a user's choice. Taking example with FIG. 10, only the last line meaning "Your kind cooperation please" is read out in the omitting mode.

FIG. 6 is a block diagram illustrating a sixth embodiment of the invention, wherein too a quotation control terminal 519 is provided to the quotation code elimination means 106 of a phonetic E-mail reader having a similar configuration with the third embodiment of FIG. 3.

While the quotation code elimination means 106 is left in an ordinary mode, the phonetic E-mail reader of the sixth embodiment operates in the same way with the third embodiment of FIG. 3.

When the quotation code elimination means 106 is controlled in an omitting mode by a user, for example, through the quotation control terminal 519, the quotation code elimination means 106 of the sixth embodiment eliminate a whole line having a quotation code found at its top from the text data to be supplied to the synthesizer 102, and send an omitting signal when a quotation line is found after a communication line.

Receiving the omitting signal, the read-out controller 312 of the embodiment supplies, to the speech synthesizer 102, an omitting message prepared in the notification message storing means 314, which may be revised by a user, for example, through the message editing terminal 313.

Therefore, quotation paragraphs are omitted from E-mail texts to be rapidly reviewed vocally according to user's choice, replaced with an appropriate notification message notifying the omission. FIG. 13 is an example of text data to be read out in the embodiment, wherein first tree lines of FIG. 10 are replaced with an omitting message notifying "Quotation here is omitted.", enabling detailed vocal review of the noticed listener.

Figure 7:
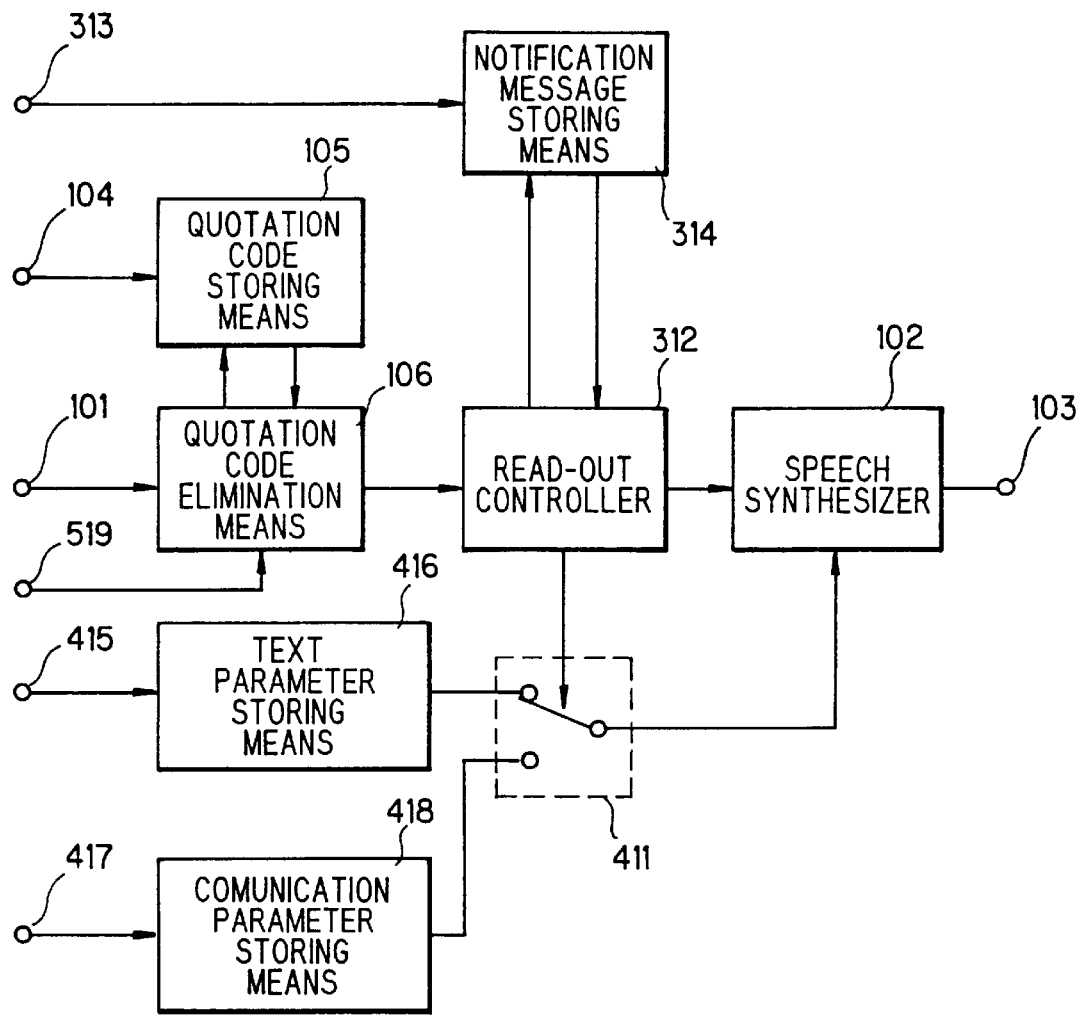
FIG. 7 is a block diagram illustrating a seventh embodiment of the invention.

FIG. 7 is a block diagram illustrating a seventh embodiment of the invention, wherein too a quotation control terminal 519 is provided to the quotation code elimination means 106 of a phonetic E-mail reader having a similar configuration with the fourth embodiment of FIG. 4.

While the quotation code elimination means 106 is left in an ordinary mode, the phonetic E-mail reader of the seventh embodiment operates in the same way with the fourth embodiment of FIG. 4.

When the quotation code elimination means 106 is controlled in an omitting mode by a user, for example, through the quotation control terminal 519, the quotation code elimination means 106 of the seventh embodiment eliminate a whole line having a quotation code found at its top from the text data to be supplied to the synthesizer 102, and send an omitting signal when a quotation line is found after a communication line in the same way with the sixth embodiment.

Receiving the omitting signal, the read-out controller 312 of the embodiment supplies, to the speech synthesizer 102, an omitting message prepared in the notification message storing means 314 in the same way with the sixth embodiment, and at the same time controls the selector 211 to select the notification parameter storing means 418 while supplying the omitting message.

Therefore, quotation paragraphs are omitted to be read out by a user's choice from E-mail texts to be rapidly reviewed vocally, replaced with an appropriate notification message notifying the omission with appropriate tone prepared according to user's choice for enabling detailed vocal review of the noticed listener.

FIG. 8 is a block diagram illustrating an eighth embodiment of the invention, comprising a header elimination means 821 for eliminating header information added through network delivering from E-mail texts supplied from the text input terminal 101 before processed in the quotation code elimination means 106, further to the first embodiment of FIG. 1.

For discriminating the header information from body texts, a first blank line, that is, a succession of carriage return codes may be detected as the end of the header information, for example.

Therefore, the header information can be omitted to be read out in the eighth embodiment.

Heretofore, the present invention is described in connection with some embodiment thereof, however it is apparent that many other applications can be considered in the scope of the invention. For example, the header elimination means 821 are preferably applied also to each of the second to the seventh embodiment as well to the first embodiment as described in the eighth embodiment.

What is claimed is:

1. A phonetic E-mail reader comprising:

a speech synthesizer for converting text data delivered thereto into vocal data corresponding to said text data;

quotation code storing means for storing quotation codes used for indicating a quotation line in an E-mail text, said quotation codes being found at a top of said quotation line, said E-mail text including communication lines not having quotation codes; and quotation code elimination means for detecting and eliminating at least one of said quotation codes inserted at tops of quotation lines in E-mail texts referring to said quotation code storing means, and for passing on communication lines and quotation lines with said quotation codes eliminated to said speech synthesizer to be converted into vocal data corresponding thereto.

2. A phonetic E-mail reader as recited in claim 1, wherein:

said quotation code eliminating means eliminates said at least one of said quotation codes, together with at least one blank code following said at least one of said quotation codes.

3. A phonetic E-mail reader as recited in claim 1, wherein:

said quotation code elimination means eliminates said at least one of said quotation codes, together with at least one character code following said at least one of said quotation codes and preceding any character code other than blank codes and said quotation codes.

4. A phonetic E-mail reader as recited in claim 1, wherein:

said quotation code elimination means operates in an omitting mode for eliminating said at least one of said quotation codes together with all character codes of said quotation lines.

5. A phonetic E-mail reader recited in claim 1, further comprises:

a header elimination means for eliminating header information from an E-mail before supplied to said quotation code elimination means when said header information is added to said E-mail text through network delivering.

6. A phonetic E-mail reader as recited in claim 1, further comprising:

communication parameter storing means for storing values of parameters to be delivered to said speech synthesizer for determining features of vocal data into which said communication lines are to be converted;

quotation parameter storing means for storing values of parameters to be delivered to said speech synthesizer for determining features of vocal data into which quotation lines are to be converted; and a selector for selecting said communication parameter storing means for delivering parameter values stored therein to said speech synthesizer when said communication lines are supplied to said speech synthesizer, and for selecting said quotation parameter storing means for delivering parameter values stored therein to said speech synthesizer, when said quotation lines are supplied to said speech synthesizer, said selector being controlled by said quotation code elimination means.

7. A phonetic E-mail reader in claim 6, wherein:

said features of vocal data include at least one of voice sex, reading speed, tone, intonation and loudness of said vocal data.

8. A phonetic E-mail reader as recited in claim 1, wherein adjacent quotation lines form a quotation paragraph and wherein said quotation code elimination means inserts a beginning signal at a beginning of a quotation paragraph and an ending signal at an end of a quotation paragraph, said phonetic E-mail reader further comprising:

notification message storing means for storing a beginning message for notifying a beginning of each of said quotation paragraphs, and for storing an ending message for notifying an ending of each of said quotation paragraphs; and a read-out controller for replacing said beginning signal with said beginning message stored in said notification message storing means, and for replacing said ending signal with said ending message stored in said notification message storing means.

9. A phonetic E-mail reader as recited in claim 8, wherein adjacent communication lines form a communication paragraph, said phonetic E-mail reader further comprising:

text parameter storing means for storing values of parameters to be delivered to said speech synthesizer for determining features of vocal data into which said communication paragraphs and said quotation paragraphs are to be converted;

notification parameter storing means for storing values of parameters to be delivered to said speech synthesizer for determining features of vocal data into which said beginning message and said ending message are to be converted; and a selector for selecting said text parameter storing means for delivering parameter values stored therein to said speech synthesizer when either of said communication paragraphs and said quotation paragraphs are supplied to said speech synthesizer, and for selecting said notification parameter storing means for delivering parameter values stored therein to said speech synthesizer when either of said beginning message and said ending message are supplied to said speech synthesizer, said selector being controlled by said read-out controller.

10. A phonetic E-mail reader recited in claim 9, wherein:

said features of vocal data include at least one of voice sex, reading speed, tone, intonation and loudness of said vocal data.

11. A phonetic E-mail reader as recited in claim 8, wherein said quotation code elimination means operates in a omitting mode for eliminating said at least one of said quotation codes together with all character codes of said quotation lines and for inserting an omitting signal in place of each of said quotation paragraphs;

said notification message storing means further store an omitting message for notifying omission of each of said quotation paragraphs eliminated; and said read-out controller replaces said omitting signal with said omitting message stored in said notification message storing means.

12. A phonetic E-mail reader recited in claim 11, further comprising:

text parameter storing means for storing values of parameters to be delivered to said speech synthesizer for determining features of vocal data into which said communication paragraphs are to be converted;

notification parameter storing means for storing values of parameters to be delivered to said speech synthesizer for determining features of vocal data into which said omitting message are to be converted; and a selector for selecting said text parameter storing means for delivering parameter values stored therein to said speech synthesizer when said communication paragraphs are supplied to said speech synthesizer, and selecting said notification parameter storing means for delivering parameter values stored therein to said speech synthesizer when said omitting messages are supplied to said speech synthesizer, controlled by said read-out controller.

13. A phonetic E-mail reader recited in claim 12, wherein:

said features of vocal data include at least one of voice sex, reading speed, tone, intonation and loudness of said vocal data.

* * * * *